Patented Oct. 7, 1941

2,257,980

UNITED STATES PATENT OFFICE 2,257,980

MANUFACTURE OF ALIPHATIC UNSATURATED NITRO COMPOUNDS

Herbert Schwarz, Leverkusen-Wiesdorf, and Johannes Nelles, Leverkusen-Schlebusch, Germany, assignors, by mesne assignments, to General Aniline & Film Corporation, New York, N. Y., a corporation of Delaware No Drawing. Application August 2, 1939, Serial No. 287,932. In Germany August 15, 1938

2 Claims. (Cl. 260—644)

The present invention relates to a new process for preparing aliphatic unsaturated nitrocompounds.

It is known that unsaturated nitrocompounds can be obtained by causing aromatic aldehydes such as benzaldehyde to react upon nitromethane. Contrary thereto, the interaction of aliphatic or araliphatic aldehydes or ketones and aliphatic nitrocompounds results in the formation of $\beta$-hydroxynitrocompounds, it being connected with difficulties to effect the splitting off of water from such compounds and to convert the same into the desired unsaturated products. We are aware of the fact that in accordance with a process described in literature unsaturated nitrocompounds have been obtained by causing alkali metal carbonates in excess to react upon acylated aliphatic $\beta$-hydroxynitrocompounds. Such conditions have proved to be unsuitable for the preparation of lower unsaturated aliphatic nitrocompounds in a technical scale as owing to the excess alkali metal carbonate undesirable by-reactions can not be avoided. Also in case higher unsaturated aliphatic nitrocompounds are intended, for instance, those containing at least 8 carbon atoms, the prior method failed to yield a satisfactory result as the reaction proceeds too slowly for being suitable for technical purposes. In each case the prior method requires the presence of a diluent such as ether.

It is an object of our present invention to do away with these disadvantages and to devolop a process which allows one to prepare aliphatic unsaturated nitrocompounds in a good yield and in a manner which fits the practical demands of a technical preparation. Other objects of our invention will be apparent from the following description and claims.

We have found that all disadvantages inherent in the prior known method can be overcome by employing the alkaline reacting substances, which are reacted upon the aliphatic O.acylated $\beta$-hydroxynitrocompounds, in an amount which is below the stoichiometric amount, preferably in an amount of between about 0.1 and about 10% (calculated upon the O.acylated $\beta$-hydroxynitrocompounds). The term "alkaline reacting substances" comprises alkali metal hydroxides or earth alkali metal hydroxides as well as salts of such metals with weak acids. Examples for the latter are sodium carbonate, sodium bicarbonate, sodium acetate and the like. Furthermore, there can be employed organic amines, such as piperidine. The term "aliphatic O.acylated $\beta$-hydroxynitrocompounds" is intended to define such compounds wherein the nitro group and the O.acyl group are bound to adjacent aliphatic carbon atoms, it being to be understood that the presence of aromatic radicals in the acyl group and/or in the side chains is not excluded from the scope of our invention. Depending on the nature of the starting materials the reaction can be performed by simply allowing the O.acylated $\beta$-hydroxynitrocompound and the alkaline reacting substance to stand at ordinary temperature or by heating the mixture thereof. The use of diluents can be dispensed with. The unsaturated nitro compounds can be isolated from the reaction mixture by distillation. In case of working in the heat, the unsaturated nitro compounds can be continuously removed by distillation.

The following examples illustrate our present invention without, however, restricting it thereto, the parts being by weight.

Example 1

72 parts of O-acetyl-1-nitropropanol-2 and 0.2 part of anhydrous sodium acetate are treated for half an hour at 100° C. The mixture is distilled under reduced pressure until the brownish colored residue begins to crystallize. There are obtained 61 parts of a mixture consisting of acetic acid and nitropropylene. The solution is washed with a saturated solution of common salt until becoming free from acetic acid and thereupon dried by means of calcium chloride. There is obtained a yield of 33 parts of pure nitropropylene, the boiling point being 43° C. at 15 mm. pressure (i. e. a theoretical yield of 78%).

Example 2

50 parts of $\beta$-nitropropylpropionate and 0.1 to 0.2 part of potassium carbonate are treated as described in Example 1. There are obtained 24 parts of nitropropylene (i. e. a theoretical yield of 89%).

Example 3

587 parts of 1-nitropentanol-2-acetate and 0.5 part of sodium hydroxyde are stirred at 100° C. When the whole sodium hydroxide has dissolved (after about 1 hour), the acid is distilled off at about 16 mm. pressure. The residue is washed with water, dried by means of calcium chloride and thereupon distilled at 16 mm. pressure. There are obtained 330 parts of nitroamylene, the boiling point being 73° C. at 16 mm. pressure (i. e. a theoretical yield of 94%).

Example 4

672 parts of 1-nitropentanol-2 are acetylated with 515 parts of acetic acid anhydride with addition of 0.2 part of concentrated sulfuric acid. The crude mixture is mixed with 10 parts of anhydrous sodium acetate and the whole acetic acid is distilled off on the water bath. The residue is further treated as described in Example 3. There are obtained 483 parts of nitroamylene (i. e. a theoretical yield of 83%).

Example 5

253 parts of β-nitrooctylacetate and 0.2 part of anhydrous sodium acetate are treated as described in Example 3. There are obtained 153 parts of nitrooctylene, the boiling point being 118–120° C. at 15 mm. pressure (i. e. a theoretical yield of 83%).

Example 6

50 parts of O-acetyl-1-nitro-4-methoxy-pentanol-2 and 0.2 part of anhydrous sodium acetate are treated as described in Example 3. There are obtained 23 parts of pure-4-methoxy-nitroamylene of the boiling point 110° C. at 15 mm. pressure (i. e. a theoretical yield of 65%).

Example 7

100 parts of 2-methyl-3-nitropentanol-4-acetate and 5 parts of anhydrous sodium acetate are distilled under reduced pressure (15 mm.). Within 12 hours a mixture consisting of acetic acid and unsaturated nitro compound distils over at about 60° C. The distillate is washed with water, thereupon dried with calcium chloride and distilled at 14 mm. pressure. It is obtained in a yield of 29 parts and shows the boiling point 67–70° C. at 14 mm. pressure. 28 parts of unchanged acetate can be recovered from the residue of the distillation. Accordingly there is obtained a theoretical yield of 60%.

Example 8

100 parts of 3-methyl-2-nitro-butanol-1-acetate and 1 part of anhydrous sodium acetate are distilled at 15 mm. pressure (oil bath: 130–150° C.). The distillate is washed with water, thereupon dried with calcium chloride and again distilled. It is obtained in a yield of 44 parts (i. e. a theoretical yield of 67%) and shows the boiling point 43° C. at 15 mm. pressure.

We claim:

1. The process which comprises causing interaction between an aliphatic O.acylated β-hydroxynitrocompound having at most eight carbon atoms in the alcohol residue of the ester and an alkaline reacting substance, the latter being employed in an amount below the stoichiometric one.

2. The process as claimed in claim 1 wherein the alkaline reacting substance is employed in an amount between about 0.1 and about 10% calculated upon the amount of aliphatic O.acylated β-hydroxynitrocompound.

HERBERT SCHWARZ.
JOHANNES NELLES.